United States Patent
Kudou (10) Patent No.: US 7,362,951 B2
(45) Date of Patent: Apr. 22, 2008

(54) DISK PLAYBACK APPARATUS AND DISK PLAYBACK METHOD

(75) Inventor: Nobunori Kudou, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1205 days.

(21) Appl. No.: 10/238,046

(22) Filed: Sep. 9, 2002

(65) Prior Publication Data

US 2003/0068158 A1 Apr. 10, 2003

(30) Foreign Application Priority Data

Sep. 19, 2001 (JP) ............................ 2001-284627

(51) Int. Cl.
*H04N 5/76* (2006.01)
*H04N 7/00* (2006.01)

(52) U.S. Cl. .............................. 386/68; 386/95; 386/98

(58) Field of Classification Search .................. 386/68, 386/70, 125, 126
See application file for complete search history.

(56) References Cited

U.S. PATENT DOCUMENTS 5,848,217 A 12/1998 Tsukagoshi et al.
6,104,861 A * 8/2000 Tsukagoshi ................... 386/95
6,115,077 A * 9/2000 Tsukagoshi ................. 348/607
6,208,805 B1 * 3/2001 Abecassis .................... 386/126
6,289,166 B1 * 9/2001 Uno et al. ..................... 386/46
6,363,207 B1 * 3/2002 Duruoz et al. ................ 386/68
6,393,196 B1 5/2002 Yamane et al.
6,587,635 B1 * 7/2003 Subramanian et al. ........ 386/68

FOREIGN PATENT DOCUMENTS

JP 9-51502 2/1997

* cited by examiner

*Primary Examiner*—Thai Tran
*Assistant Examiner*—Gelek Topgyal
(74) *Attorney, Agent, or Firm*—Brinks Hofer Gilson & Lione

(57) ABSTRACT

When an instruction is given to perform a playback operation, for example, a fast-forward operation, at a speed greater than normal, a system controller obtains playback data (VOBU) corresponding to a current playback position, and the video images and the subtitles are played back by using this VOBU, and are displayed. The system controller then moves the playback position by a predetermined amount of movement (for example, three VOBUs) without performing the fast playback operation. The fast playback operation is then performed by using the VOBU corresponding to the moved playback position. In this manner, the fast playback operation and the movement operation are alternately repeated to display the video images and the subtitles.

17 Claims, 9 Drawing Sheets

DISK PLAYBACK APPARATUS AND DISK PLAYBACK METHOD

BACKGROUND OF THE INVENTION

1. Field of the Invention

The present invention relates to a disk playback apparatus and a disk playback method for performing a playback operation of, for example, digital versatile disks (DVDs).

2. Description of the Related Art

DVDs are receiving widespread attention as disc recording media. A DVD has a diameter of 12 cm and a thickness of 1.2 mm, which are the same dimensions as a compact disc (CD). However, a DVD achieves a greater recording capacity than a CD, such as 4.7 GB for a single layer and 8.5 GB for double layers, by increasing the recording density.

A mixture of various types of data can be stored in a DVD using image data compression techniques, such as MPEG2 or audio data compression techniques, and control data for implementing various functions also can be stored in the DVD. When, for example, a movie is recorded on a DVD, video data and audio data are normally stored. However, in addition to the video data and the audio data, other types of data, for example, subtitle data including a plurality of languages, can be stored so that a user is able to select and display a desired language.

In most DVD playback apparatuses, when playing back a movie recorded on a DVD, the movie can be played back at a speed greater than normal speed, such as from 2× to 30×, by entering a fast-forward or a fast-rewind instruction, so as to locate a desired playback position. Playback operations at various speeds are implemented as follows. When the playback speed is lower, the same number of images (for example, 60/second) as that at the normal playback speed are decoded, and the images are produced by reducing the number of images according to the playback speed. When the playback speed is higher, video object units (VOBUs), which are predetermined playback units, are sparsely extracted and are played back.

In known disk playback apparatuses, when video and sound of, for example, a movie, are played back at a greater playback speed (for example, 2× or higher) while displaying the subtitles, the decoding operation cannot keep up with the playback operation, and thus, the subtitles cannot be displayed in a scene in which the subtitles should normally be displayed. Accordingly, when searching for a desired playback position by performing a fast-forward or a fast-rewind operation, the user cannot locate the desired position while checking the content of the subtitles. It is difficult to locate a playback position, for example, in scenes in which only the words (speech) change with very little change in the images. In this case, the ease of operation is substantially reduced.

Also in known disk playback apparatuses, when the playback speed is returned to the normal playback speed from a speed greater than normal, the subtitles when the normal playback speed is resumed sometimes cannot be displayed, and the subtitles normally start at a subsequent playback position. In this case, the user must wait until the subtitles are subsequently displayed or must perform a playback operation once again at a speed greater than normal to locate the playback position. The playback position cannot be located by checking the subtitles without performing the above-described complicated operation.

SUMMARY OF THE INVENTION

Accordingly, in view of the above-described problem, it is an object of the present invention to improve the ease of operation when locating a desired playback operation.

In order to achieve the above-described object, according to a disk playback apparatus of the present invention, when playing back video images and subtitles recorded on a disk recording medium, a fast playback operation for playing back the video images and the subtitles at a playback speed of n× which enables the subtitles to be displayed and a movement operation for moving a playback position without performing the fast playback operation are alternately repeated.

More specifically, according to the disk playback apparatus of the present invention, the fast playback operation and a normal playback operation for playing back the video images and the subtitles at a normal playback speed are performed by a playback unit; the movement operation is performed by a movement controller; and when an instruction is given by using an operation unit to perform a playback operation at a playback speed greater than n×, control is performed by an operation/movement alternating controller so that the fast playback operation performed by the playback unit and the movement operation performed by the movement controller are alternately repeated.

By alternately repeating the fast playback operation and the movement operation, the playback operation at a playback speed greater than n× is implemented. Accordingly, even when the playback operation at a playback speed greater than n× is specified, the subtitles can be displayed. This enables the user to search for a desired playback position by checking the subtitles, thereby improving the ease of operation.

When subtitle information required for playing back the subtitles is dispersed in part of the video information required for playing back the video images, the movement controller may move the playback position to a position at which the next subtitles are to be displayed after the subtitles and the corresponding video images are played back. With this arrangement, since the playback position is moved by searching for a position at which the subtitles can be played back, the subtitles can be reliably picked up and played back.

The aforementioned disk playback apparatus may further comprise an amount-of-movement varying unit for setting a variable amount of movement by which the playback position is to be moved by the movement controller. With this arrangement, it is possible to set a desired playback speed when the playback operation greater than n× is specified.

Subtitle information required for playing back the subtitles can be played back only at predetermined playback positions. In this case, when the playback position moved by the movement controller is displaced from the predetermined playback positions, the movement controller may search for a predetermined range before and after the moved playback position to detect the predetermined playback position, thereby adjusting the playback position. With this arrangement, even if the moved playback position is displaced from the predetermined playback positions, the subtitles can be displayed.

When the predetermined playback position is not detected in the predetermined range by the movement controller, the playback unit may temporarily perform the fast playback operation in such a manner that the subtitles are not played back. With this arrangement, if the position at which the subtitle can be displayed cannot be detected after a while, the search operation for the playback position is suspended after performing it for a while, and the fast playback operation is performed. If the search operation is performed until the predetermined playback position is detected in the above-described situation, it would be difficult for the user to understand the relationship between the two scenes.

Playback information recorded in the disk recording medium contains a restricted area in which the playback operation to be performed at a playback speed other than the normal playback speed is restricted. In this case, when the playback position moved by the movement controller is contained within the restricted area, the playback unit may perform the normal playback operation until the playback position is located outside the restricted area. Accordingly, when the playback position after being moved is located within the restricted area, the playback operation can be reliably performed at the normal speed.

The movement operation may be performed in the forward direction or in the rewind direction of the playback position. Accordingly, the movement operation can be performed in a desired direction, i.e., in the forward direction (in the direction in which the playback time advances) or in the reverse direction (in the direction in which the playback time is rewound).

The playback speed n× which enables the subtitles to be displayed may be 2×. Decoding processing for the video images and the subtitles are easy at the playback speed of about 2×. Accordingly, it is not necessary to provide an expensive decoder, and the cost of the disk playback apparatus can be kept low. Additionally, the user can easily read and understand the displayed subtitles at the playback speed of ×2.

When the disk recording medium is a DVD, the movement controller may move the playback position by using video object units as a reference. In a DVD in which, for example, a movie is recorded, data, such as video images and subtitles, are recorded by using video object units as a reference according to known DVD-Video standards. Accordingly, by performing the movement operation by using the video object units as a reference, data can be handled easily, and the processing can be simplified.

When the disk recording medium is a DVD, the above-described predetermined playback position may be located at the head of a sub-picture unit. In moving the playback position by using the video object units as a reference, when the head of the sub-picture unit is not contained in the video object unit to which the playback position is moved, the movement controller may search for the video object unit containing the head of the sub-picture unit in the vicinity of the video object unit to which the playback position is moved. In a typical DVD in which, for example, a movie is recorded, sub-picture units are recorded as subtitle displaying data. The sub-picture unit contains control data for controlling a sub-picture to be played back at the head of the sub-picture unit, and information indicating the storage location of the image data used for displaying the sub-picture. Accordingly, the above-described predetermined playback position is located at the head of the sub-picture unit, and if the video object unit to which the playback position is moved does not contain the head of the sub-picture unit, another video object unit containing the head of the sub-picture unit is searched. Thus, the subtitles can be reliably displayed.

The head of the sub-picture unit may be searched based on information of a navigation pack which is obtained before searching for the head of the sub-picture unit. Each object unit includes a navigation pack containing information about the corresponding video images, subtitles, and sound. Accordingly, the head of the sub-picture unit can be easily searched for by referring to the information of the navigation pack.

When the disk recording medium is a DVD, and when the above-described restricted area is set in units of cells, the playback unit may perform the normal playback operation when the playback position is moved to a cell in which the restricted area is set. A determination as to whether the restricted area is set can be simply made for each cell, and thus, the processing is easy, thereby decreasing the processing load.

DESCRIPTION OF THE PREFERRED EMBODIMENTS

A disk playback apparatus constructed in accordance with an embodiment of the present invention is described below with reference to the accompanying drawings.

(1) Content of Data Recorded in DVD

Details of data recorded in a DVD, which serves as a disk recording medium, are described below.

Figure 1:
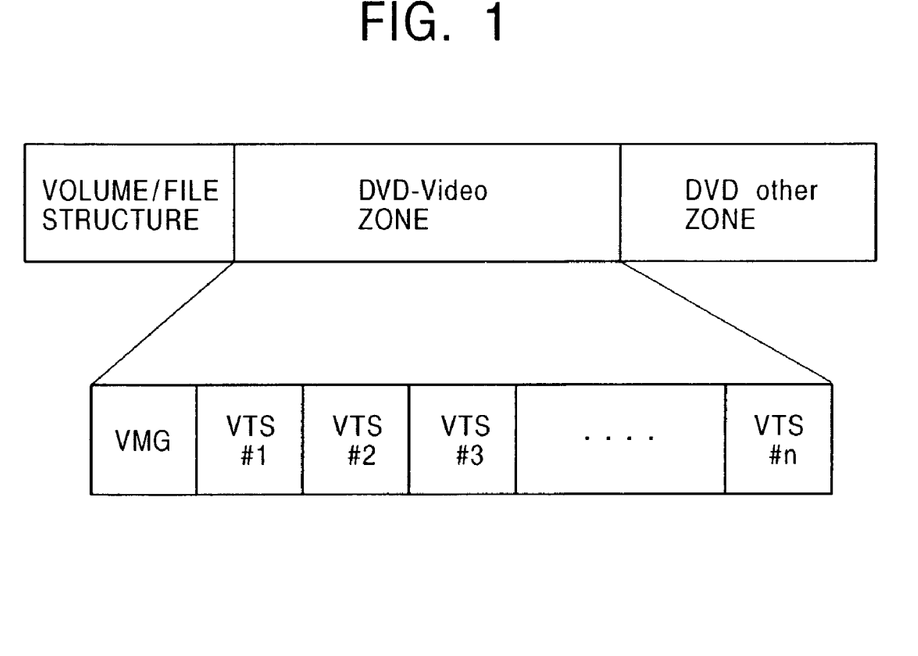
FIG. 1 illustrates the structure of a volume space of a DVD.

FIG. 1 illustrates the structure of a volume space of a DVD. The volume space of a DVD is formed of a volume/file structure, a DVD-Video zone, and a DVD other zone in that order from the inner periphery to the outer periphery of the DVD. In the DVD-Video zone, various types of data required for a playback operation are stored. The DVD-Video zone is formed of a video manager (VMG) and at least one video title set (VTS) corresponding to a title.

Figure 2:
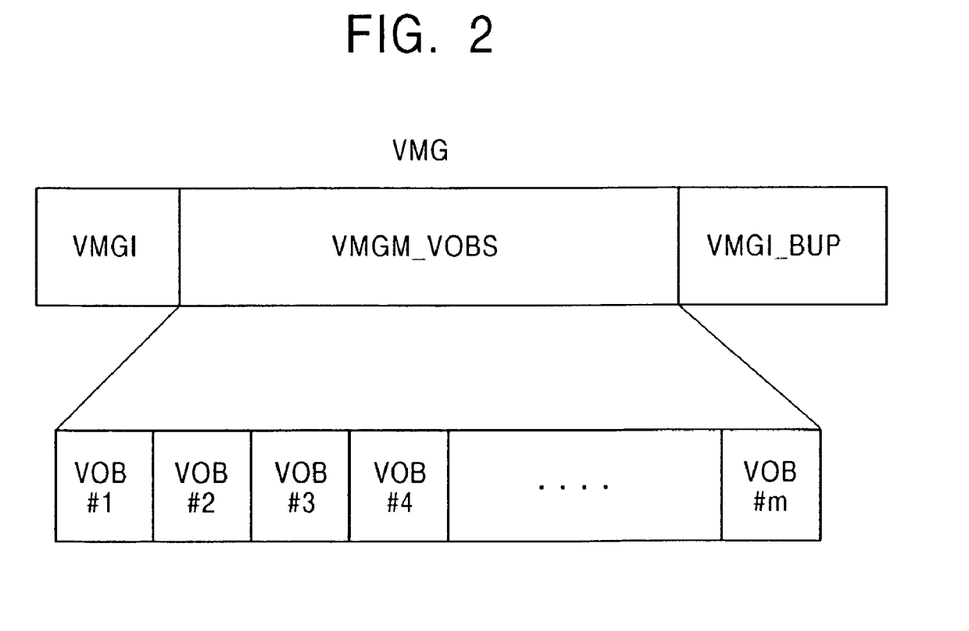
FIG. 2 illustrates the data structure of a video manager (VMG)

FIG. 2 illustrates the data structure of the VMG. The VMG is formed of video manager information (VMGI), a VMG menu video object set (VMGM_VOBS), and a VMGI backup file (VMGI_BUP). The VGMI includes information concerning the VTSs (the number of VTSs, a VTS number for identifying each VTS, the storage location of each VTS in the DVD, etc.), the display order of the titles displayed in a title menu, at least one item of program chain information (PGCI), VMG ID information for identifying the DVD (VMG_ID), the disk name (for example, a movie title), etc. The VMGM_VOBS is formed of at least one video object (VOB). The VOB includes video data, which is playback data for playing back a menu screen (title menu screen) for selecting the title.

Figure 3:
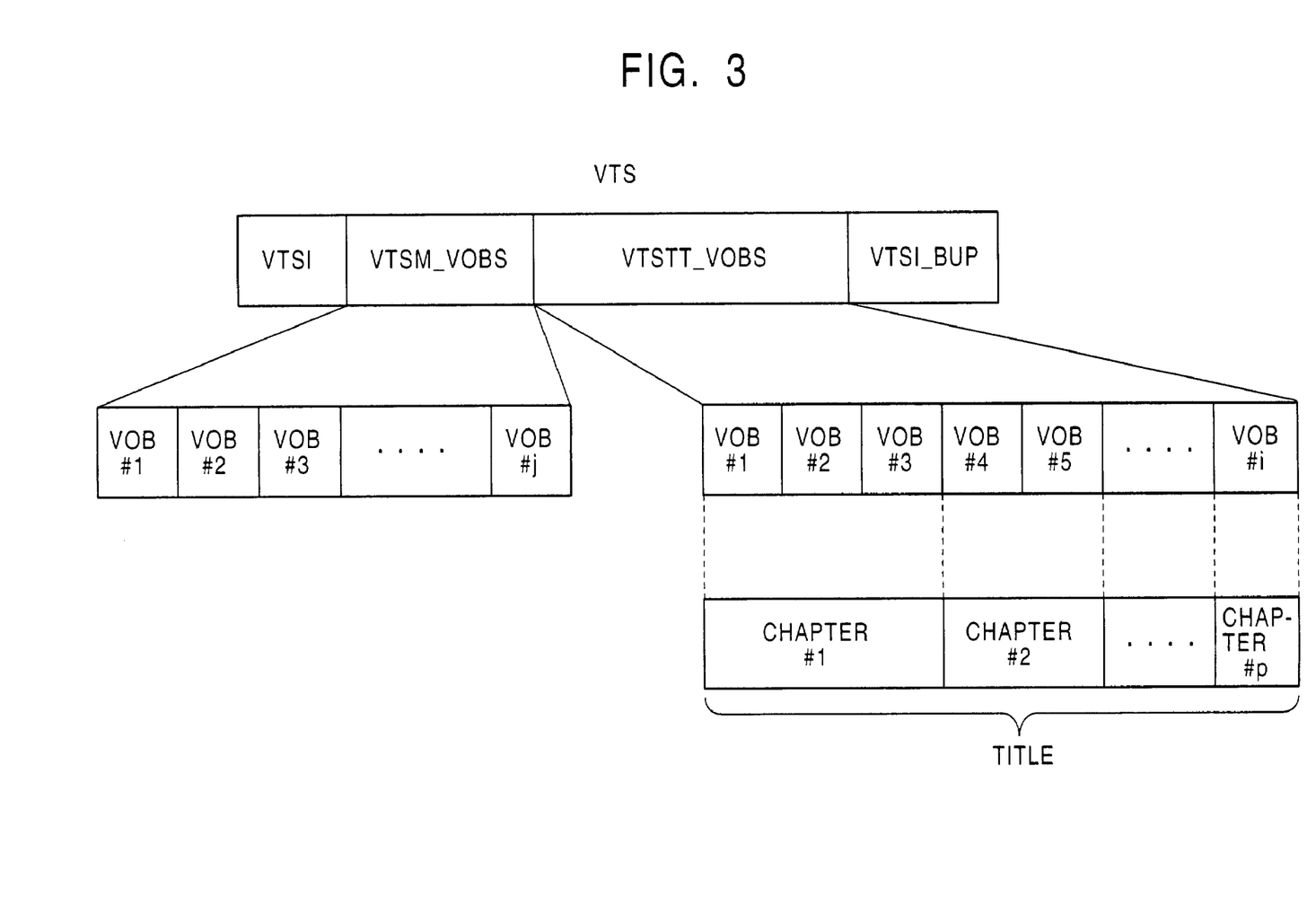
FIG. 3 illustrates the data structure of a video title set (VTS)

FIG. 3 illustrates the data structure of the VTS. The VTS is formed of video title set information (VTSI), a VTS menu video object set (VTSM_VOBS), a VTS title video object set (VTSTT_VOBS), and a VTSI backup file (VTSI_BUP).

The VTSI includes information concerning the title, a chapter (PTT) number for identifying each chapter in the VTS, and at least one PGCI item. The VTSM_VOBS and the VTSTT_VOBS are each formed of at least one VOB. The VOB includes playback data, such as video data and audio data. The playback data of the title is contained in VOB#1 through VOB#i in the VTSTT_VOBS. Chapters are the units obtained by dividing the title, and the playback data in each chapter is formed of at least one cell, and is contained in at least one VOB in the VTSTT_VOBS. Alternatively, a plurality of chapters may be contained in one VOB. For example, as shown in FIG. 3, the title is divided into chapter#1 through chapter#p, and the playback data in chapter#1 is contained in VOB#1 through VOB#3, and the playback data in chapter #2 is contained in VOB#4 and VOB#5.

Figure 4:
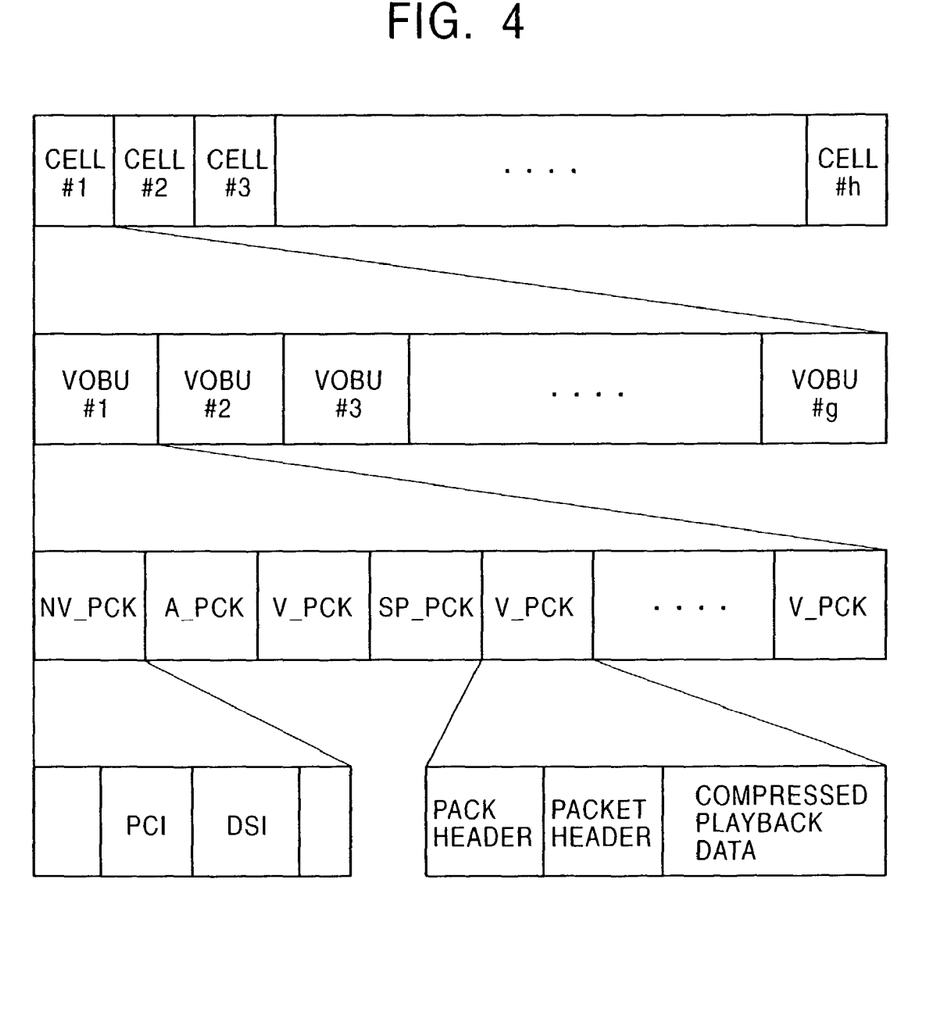
FIG. 4 illustrates the data structure of a video object (VOB) contained in a VMG menu video object set (VMGM_VOBS), VTS menu video object set (VTSM_VOBS), or VTS title video object set (VTSTT_VOBS)

FIG. 4 illustrates the data structure of a VOB contained in the VMGM_VOBS, VTSM_VOBS, and VTSTT_VOBS. The VOB is formed of a plurality of cells, and when a playback operation is performed at a speed greater than the normal playback speed, such as a fast-forward or a fast-rewind operation, the cells are used as the units. Each cell is formed by a plurality of video object units (VOBUs). Each VOBU includes at least one of a navigation pack (NV_PCK), a video pack (V_PCK), a sub-picture pack (SP_PCK), and an audio pack (A_PCK).

The NV_PCK includes playback control information (PCI) and data search information (DSI). The PCI and the DSI include the amount of VOBU data and the VOBU position to be subsequently played back. The V_PCK, SP_PCK, and A_PCK are each formed of a pack header containing information, such as the type of playback data (a moving picture, a sub-picture, or audio), a packet header, and compressed playback data (such as data-compressed video data, sub-picture data, or audio data).

Figure 5:
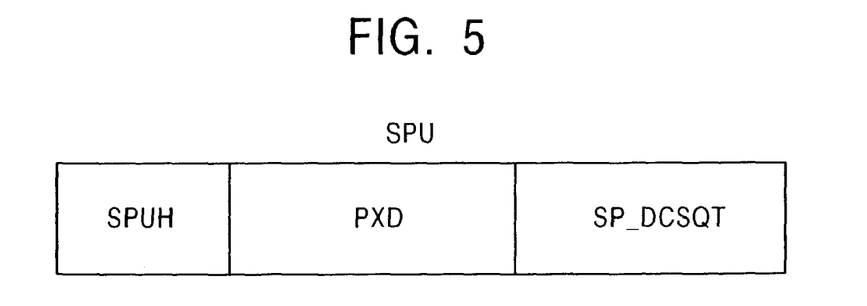
FIG. 5 illustrates the data structure of sub-picture data (SPU)

By combining a plurality of SP_PCKs contained in the VOBU, a sub-picture unit (SPU), which is the unit of processing when the subtitle is played back, is formed. FIG. 5 illustrates the data structure of the SPU. The SPU is formed of a sub-picture unit header (SPUH), pixel data (PXD), and a sub-picture display control sequence table (SP_DCSQT), arranged in that order sequentially from the header. The SPUH includes a SPU data size and the header address of the SP_DCSQT. The PXD contains image data for displaying the sub-picture. The SP_DCSQT contains control data required for controlling the display state, such as display start time and end time.

(2) Overall Configuration of Disk Playback Apparatus

Figure 6:
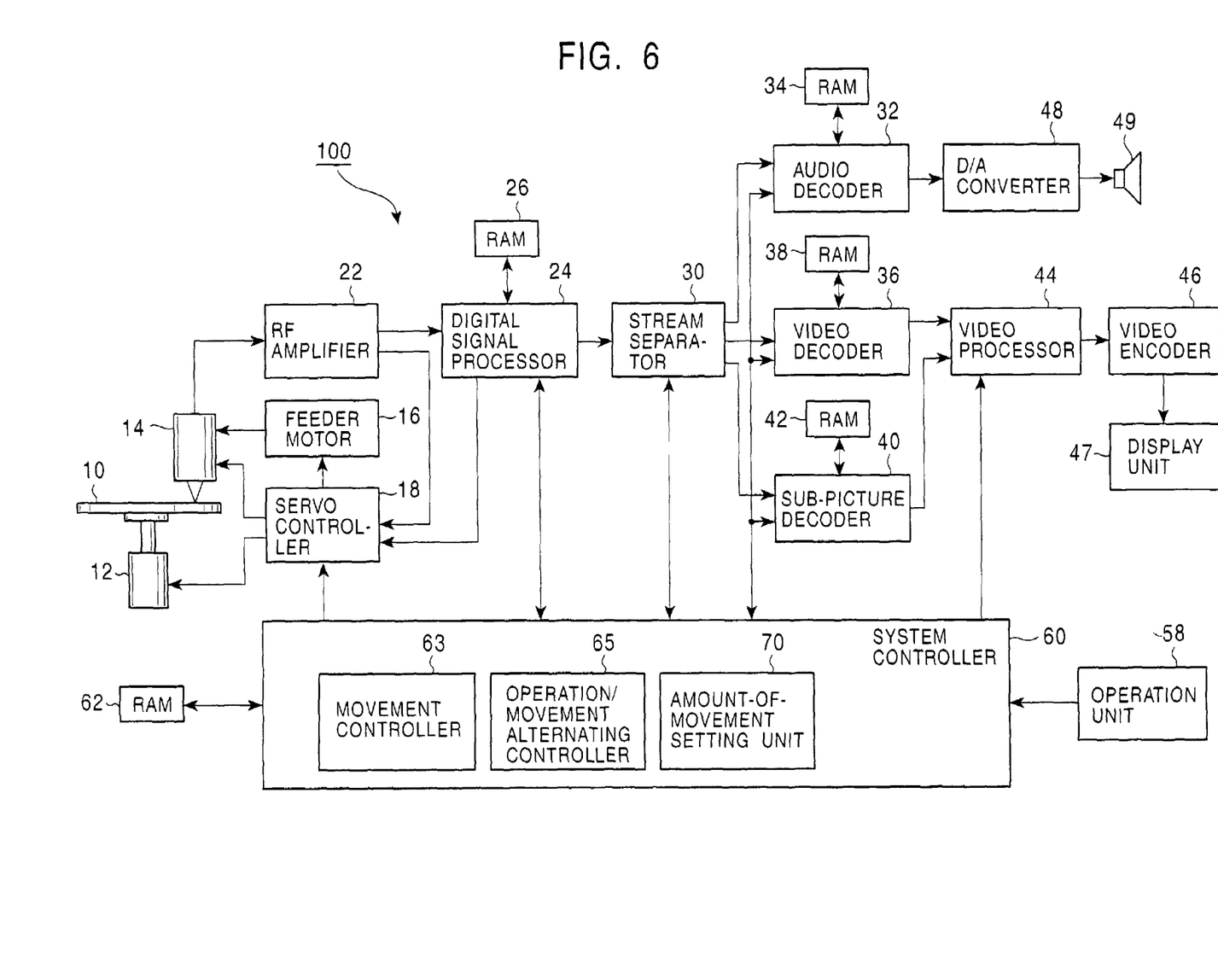
FIG. 6 is a block diagram illustrating the overall configuration of a disk playback apparatus according to an embodiment of the present invention.

FIG. 6 is a block diagram illustrating the overall configuration of a disk playback apparatus 100 according to an embodiment of the present invention. The disk playback apparatus 100 includes a spindle motor 12, an optical pickup 14, a feeder motor 16, a servo controller 18, a radio frequency (RF) amplifier 22, a digital signal processor 24, four buffering random access memories (RAMs) 26, 34, 38, and 42, a stream separator 30, an audio decoder 32, a video decoder 36, a sub-picture decoder 40, a video processor 44, a video encoder 46, a display unit 47, a digital-to-analog (D/A) converter 48, a speaker 49, an operation unit 58, a system controller 60, and a RAM 62.

The spindle motor 12 rotates the DVD 10 at a predetermined speed. The optical pickup 14, which is used for detecting data recorded on the DVD 10, has, for example, a semiconductor laser and a photodiode integrated therein. The feeder motor 16 moves the optical pickup 14 in the radial direction of the DVD 10.

The servo controller 18 drives the spindle motor 12 and the feeder motor 16 according to an instruction from the system controller 60, and also moves an objective lens (not shown) contained in the optical pickup 14 so as to move the focal position of the semiconductor laser contained in the optical pickup 14 in the vertical direction or in the horizontal direction with respect to the recording surface of the DVD 10. The servo controller 18 performs various servo control operations (focus servo, tracking servo, and rotation servo) required for reading the data from the DVD 10.

The RF amplifier 22 amplifies an electric signal from the photodiode contained in the optical pickup 14. The digital signal processor 24 converts the signal from the RF amplifier 22 into digital data, performs demodulation processing (8-16 demodulation processing) and error correction processing on the digital data according to the data format of the DVD 10, and stores the digital data in the RAM 26. In response to an instruction from the system controller 60, the digital signal processor 24 extracts the control data from the RAM 26 and supplies the extracted data to the system controller 60. The digital signal processor 24 also extracts a VOBU and supplies it to the stream separator 30.

In response to an instruction from the system controller 60, the stream separator 30 separates the NV_PCK, the A_PCK, the V_PCK, and the SP_PCK from the VOBU received from the digital processor 24, and allocates and provides the separated elements to the corresponding decoders and to the system controller 60. More specifically, the A_PCK is provided to the audio decoder 32, the V_PCK is provided to the video decoder 36, the SP_PCK is provided to the sub-picture decoder 40, and the NV_PCK is provided to the system controller 60.

The audio decoder 32 performs a predetermined decoding processing on the A_PCK received from the stream separator 30, and provides the resulting audio data as an output. The video decoder 36 performs a predetermined decoding processing on the V_PCK received from the stream separator 30, and provides the resulting video data as an output. The sub-picture decoder 40 performs a predetermined decoding processing on the SP_PCK received from the stream separator 30 and provides the resulting sub-picture data as an output.

In response to an instruction from the system controller 60, the video processor 44 creates image data by combining the video data supplied by the video decoder 36 and the sub-picture data supplied by the sub-picture decoder 40, and provides the created image data to the video encoder 46.

The video encoder 46 converts the image data from the video processor 44 into a display image signal. The display image signal is supplied to the display unit 47, and then, the corresponding image is displayed.

The D/A converter 48 converts the audio data from the audio decoder 32 into an analog audio signal. The analog audio signal is supplied to the speaker 49, and then, the corresponding audio sound is played back.

The operation unit 58 includes various operation keys, such as a playback key, a stop key, a fast-forward key, and a rewind key, and provides a signal to the system controller 60 according to the key operation. By using this operation unit 58, a desired playback speed ranging from 2× to 30× can be specified to perform a playback operation.

The system controller 60 controls all the functional blocks by, for example, providing various servo instructions to the servo controller 18 and providing an image generating instruction to the video processor 44 according to an instruction from the user. The system controller 60 includes a movement controller 63, an operation/movement alternating controller 65, and an amount-of-movement setting unit 70.

When playing back subtitles and a corresponding image, the movement controller 63 provides an instruction to move the playback position to the playback position at which the subtitles can be displayed to the servo controller 18.

The operation/movement alternating controller 65 performs control such that the fast playback operation at a speed of n× by the video decoder 36 and the sub-picture decoder 40 and the movement control by the movement controller 63 can be alternately performed.

The amount-of-movement setting unit 70 sets the variable amount of movement required for moving the playback position in response to a fast-forward or rewind instruction. More specifically, in the disk playback apparatus 100 of this embodiment, if the playback speed specified by the user is 2×, a typical fast playback operation is performed, i.e., images and subtitles are decoded in a manner similar to the playback operation at the normal speed, and only the odd-numbered or even-numbered frames are provided when the images (including the subtitles) are played back. If the playback speed specified by the user is greater than 2×, the above-described fast playback operation at 2× and the movement operation in which the playback position is moved in VOBU units are alternately repeated, thereby implementing, for example, a fast-forward playback operation at a speed greater than 2×. When a fast-forward playback operation at a speed greater than 2× is specified, the amount-of-movement setting unit 70 calculates how many VOBUs are to be moved according to the specified playback speed so as to determine the amount of movement of the playback position. It is thus possible to set a desired playback speed when a playback operation is to be performed at a speed greater than 2×. Since the movement operation is performed in units of VOBUs, the data can be handled easily, and the processing can be simplified.

The above-described video decoder 36 and the sub-picture decoder 40 correspond to a playback unit, and the amount-of-movement setting unit 70 corresponds to an amount-of-movement varying unit.

(3) Operation of Disk Playback Apparatus

The operation of the disk playback apparatus 100 when the playback operation at a playback speed greater than 2× is specified is discussed below.

Figure 7:
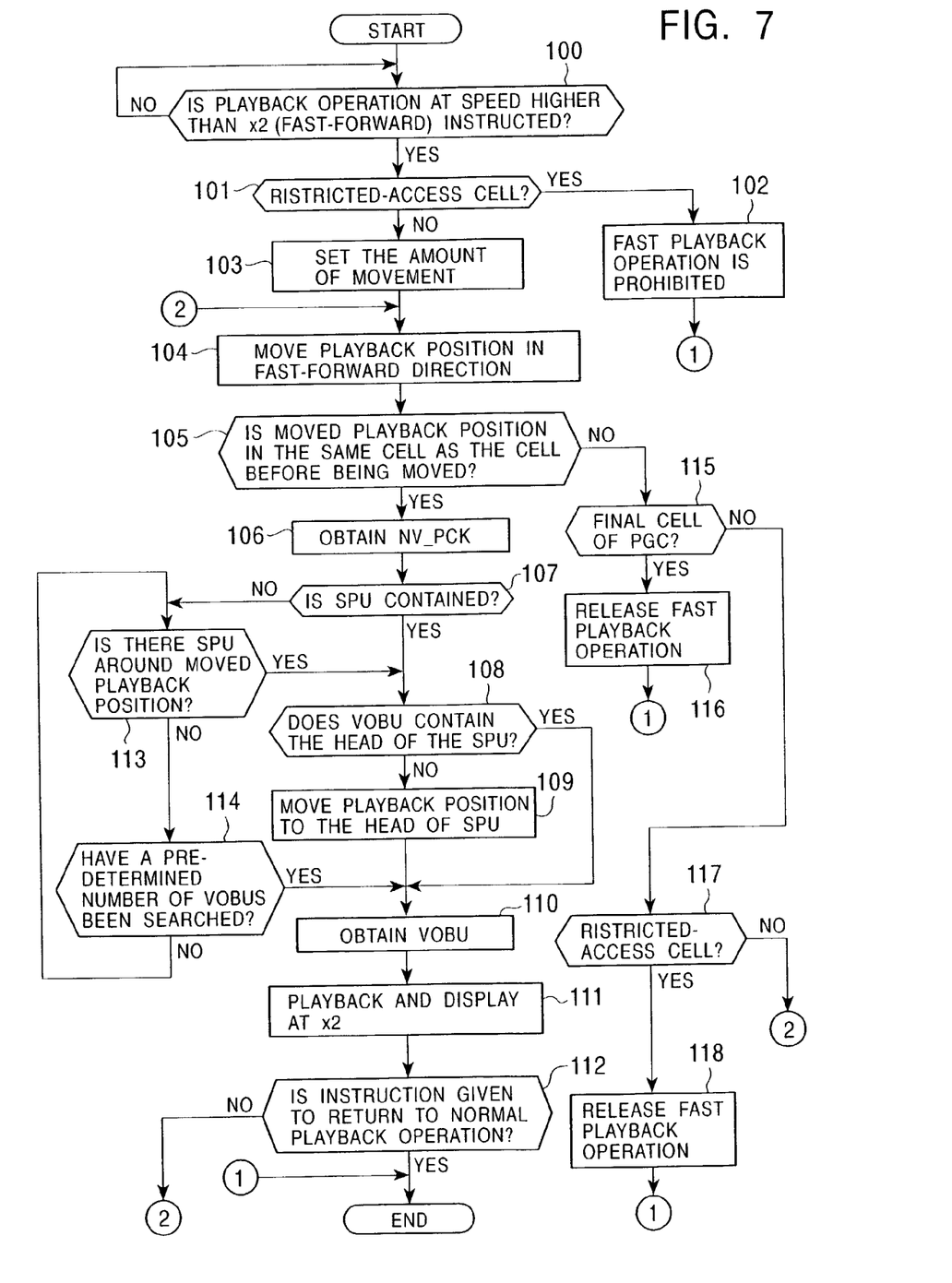
FIG. 7 is a flowchart illustrating the operation of the disk playback apparatus when a playback operation is performed at a speed greater than 2× in the fast-forward direction of the playback position.

FIG. 7 is a flowchart illustrating the operation of the disk playback apparatus 100 when the playback operation is performed at a speed greater than 2× in the fast-forward direction of the playback position.

In step 100, the system controller 60 determines whether an instruction (for example, a fast-forward instruction) to perform a playback operation at a speed greater than 2× has been given by the user using the operation unit 58 while the normal playback operation is being performed. If the outcome of step 100 is no, step 100 is repeated until the playback operation at a speed greater than 2× is specified.

If the outcome of step 100 is yes, the system controller 60 determines in step 101 whether the cell corresponding to the current playback position is a restricted-access cell for which access, such as fast-forwarding, is prohibited. If the cell is a restricted-access cell, the process proceeds to step 102 in which the system controller 60 prohibits the fast playback operation. More specifically, the fast playback operation is not performed, and a message indicating, for example, that the fast-forward operation is not allowed, is displayed, and the process returns to the normal playback operation.

If the cell is not a restricted-access cell, the process proceeds to step 103 in which the amount-of-movement setting unit 70 of the system controller 60 sets the amount of movement by which the playback position is to be moved based on a user's instruction. In this case, as discussed above, the amount of movement is determined in units of VOBUs, for example, three VOBUs. In step 104, the system controller 60 performs control such that the playback position is moved in the fast-forward direction based on the amount of movement set in step 103.

In step 105, the system controller 60 determines whether the moved playback position is located in the same cell as the cell before being moved. If the outcome of step 105 is yes, the process proceeds to step 106 in which the system controller 60 obtains the NV_PCK (navigation pack) contained in the VOBU corresponding to the current playback position. Then, in step S107, the system controller 60 determines whether an SPU is contained in the current VOBU. In this manner, by referring to the navigation pack (NV_PCK), the storage location of the SPU can be easily searched.

If it is found in step 107 that an SPU is contained in the current VOBU, the process proceeds to step 108 in which it is determined whether the VOBU contains the head of the SPU. More specifically, the effective duration of the SPU may range over a plurality of VOBUs, in which case, the VOBU corresponding to the start time of the effective duration contains the head of the SPU. If the effective duration does not range over a plurality of VOBUs, the VOBU contains the head of SPU. A specific example of the relationship between the VOBUs and the SPUs is described below. If the VOBU does not contain the head of the SPU, the process proceeds to step 109 in which the system controller 60 moves the playback position to the head of the SPU.

After step 109, or when the outcome of step 108 is yes, the process proceeds to step 110 in which the system controller 60 obtains the VOBU corresponding to the current playback position. Then, in step 111, the system controller 60 plays back the image and the subtitles at a playback speed of 2× by using the VOBU obtained in step 110, and displays the image and subtitles.

Subsequently, in step 112, the system controller 60 determines whether the user has given an instruction to return to the normal playback operation by using the operation unit 58. If the result of step 112 is no, the process returns to step 104, and the corresponding processing is repeated. If there is an instruction to return to the normal playback operation, the system controller 60 releases the fast playback operation, and the normal playback operation resumes.

If it is found in step 107 that there is no SPU contained in the VOBU corresponding to the moved playback position, the process proceeds to step 113 in which the system controller 60 searches a predetermined number of VOBUs around the moved playback position, and determines whether there is an SPU contained in such VOBUs. For example, the two VOBUs before and after the playback position are searched.

If there is no SPU in the VOBUs, the process proceeds to step 114 in which the system controller 60 determines whether the number of searched VOBUs has reached the predetermined number. If the outcome of step 114 is no, the process returns to step 113, and the corresponding processing is repeated.

If it is found in step 113 that there is an SPU around the moved playback position, the process proceeds to step 108 in which the system controller 60 performs the corresponding processing. If a predetermined number of VOBUs have been searched in step 114, the process proceeds to step 110 in which the VOBU corresponding to the moved playback position (VOBU without an SPU) is obtained, and the corresponding processing is performed.

If it is found in step 105 that the moved playback position is not located in the same cell as the cell before being moved, the process proceeds to step 115 in which the system controller 60 determines whether the moved playback position is located in the final cell of the PGC (program chain), which is the logical unit for the playback operation. If the moved playback position is the final cell, the process proceeds to step 116 in which the system controller 60 releases the fast playback operation, and the normal playback operation resumes.

If it is found in step 115 that the moved playback position is not located in the final cell, the process proceeds to step 117. In step 117, the system controller 60 determines whether the current cell is a restricted-access cell. If the outcome of step 117 is no, the process returns to step 104 in which the system controller 60 performs the corresponding processing. If the current cell is a restricted-access cell, the process proceeds to step 118 in which the system controller 60 releases the fast playback operation, and the normal playback operation resumes. In this manner, it is determined whether the moved playback position is contained in a restricted-access cell (restricted area), and if so, the playback operation can be reliably performed at the normal playback speed. This determination can be simply made for each cell, and thus, the processing is easy, thereby decreasing the processing load.

Figure 8:
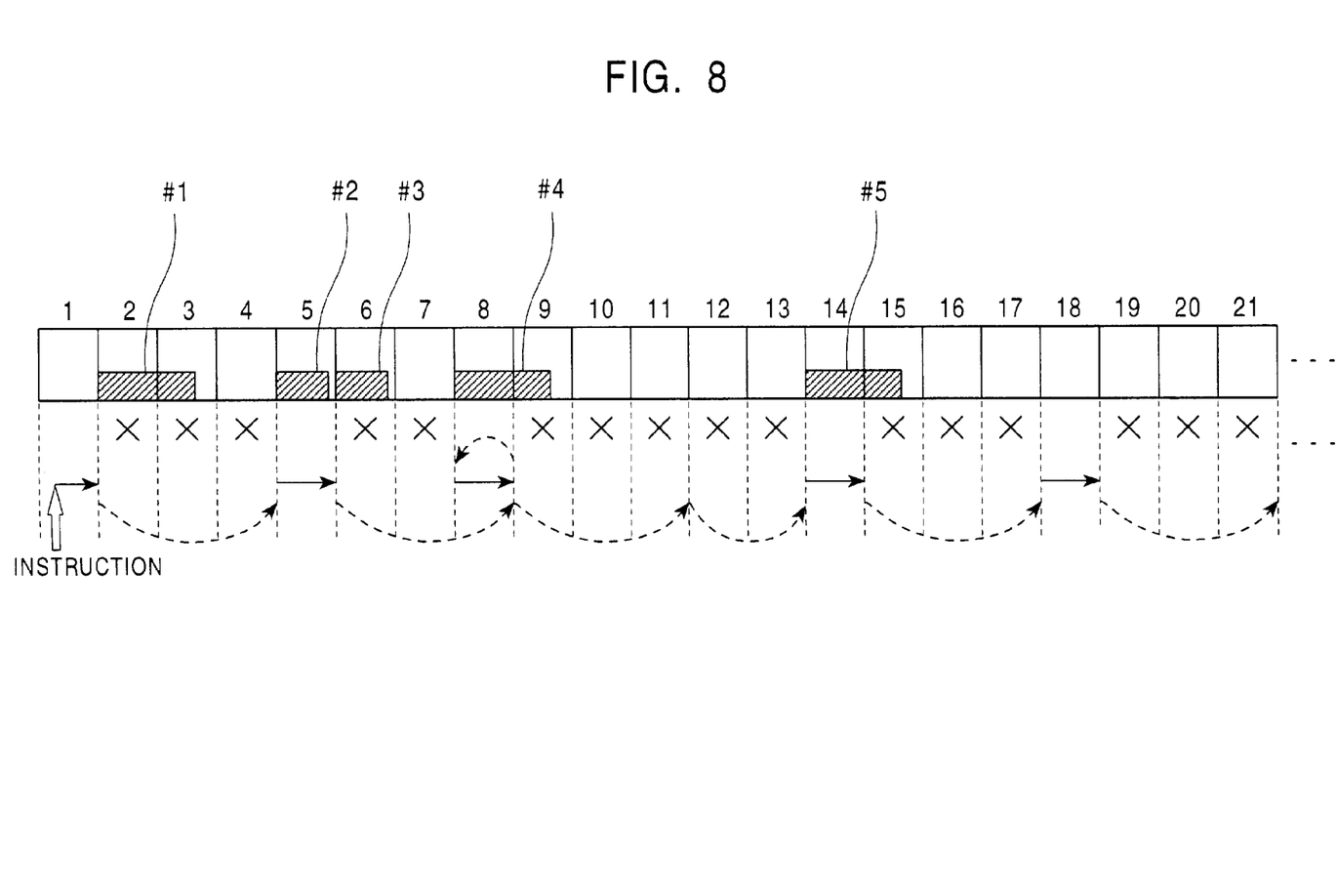
FIG. 8 illustrates a specific example of the playback operation performed at a speed greater than 2× in the forward direction of the playback position.

FIG. 8 illustrates a specific example of the fast playback operation performed at a speed greater than 2× in the fast-forward direction. In FIG. 8, the rectangles indicated by numbers 1 through 21 are VOBUs, and the hatched rectangles contained in the VOBUs are SPUs. The horizontal length of the SPUs indicate the effective duration for which the subtitles are displayed. In this example, it is assumed that the amount of movement is set to three VOBUs.

When an instruction is provided to perform a playback operation at a speed greater than 2× while performing the normal playback operation by using VOBU1, the fast playback operation at 2× is first performed by using VOBU1. Then, the playback position is moved based on the set amount of movement. More specifically, the playback position is moved to VOBU5 by skipping VOBU2 through VOBU4. Since VOBU5 contains the head of SPU#2, the corresponding image and subtitles are played back at 2× by using VOBU5. Upon completion of the playback operation at 2× by using VOBU5, the playback position is moved to VOBU9 by skipping VOBU6 through VOBU8. Although SPU#4 is contained in VOBU9, the head of SPU#4 is not. Accordingly, the playback position is adjusted to VOBU8 containing the head of SPU#4. Then, the playback operation is performed at 2× by using VOBU8.

Upon completion of the fast playback operation at 2× by using the VOBU8, the playback position is moved to VOBU12 by skipping VOBU9 through VOBU11. Since VOBU12 does not contain an SPU, a predetermined number of VOBUs before and after VOBU12 are searched for an SPU. In the example shown in FIG. 8, since SPU#5 is contained in VOBU14, the playback position is adjusted to VOBU14, and the playback operation is performed at 2× by using VOBU14. In this manner, since the playback position is adjusted by detecting the head of an SPU, the subtitles can be displayed even if the moved playback operation is originally displaced from the position at which the subtitle can be displayed.

Upon completion of the fast playback operation by using VOBU14, the playback position is moved to VOBU18. Since an SPU is not contained in VOBU18, a predetermined number of VOBUs before and after VOBU18 are searched for an SPU. In the example shown in FIG. 8, the two VOBs before VOBU18 and the two VOBs after VOB18, i.e., VOBU16, VOBU17, VOBU19, and VOBU20, are searched. However, since none of these VOBUs contains an SPU, the fast playback operation is performed by using VOBU18. Accordingly, if the position at which the subtitle can be displayed (the head of an SPU) cannot be detected after a while, the search operation for the playback position is suspended after performing it for a while, and the fast playback operation is performed by using a VOBU without an SPU. If the search operation is performed until the head of an SPU is detected in the above-described situation, it would be difficult for the user to understand the relationship between the two scenes.

Figure 9:
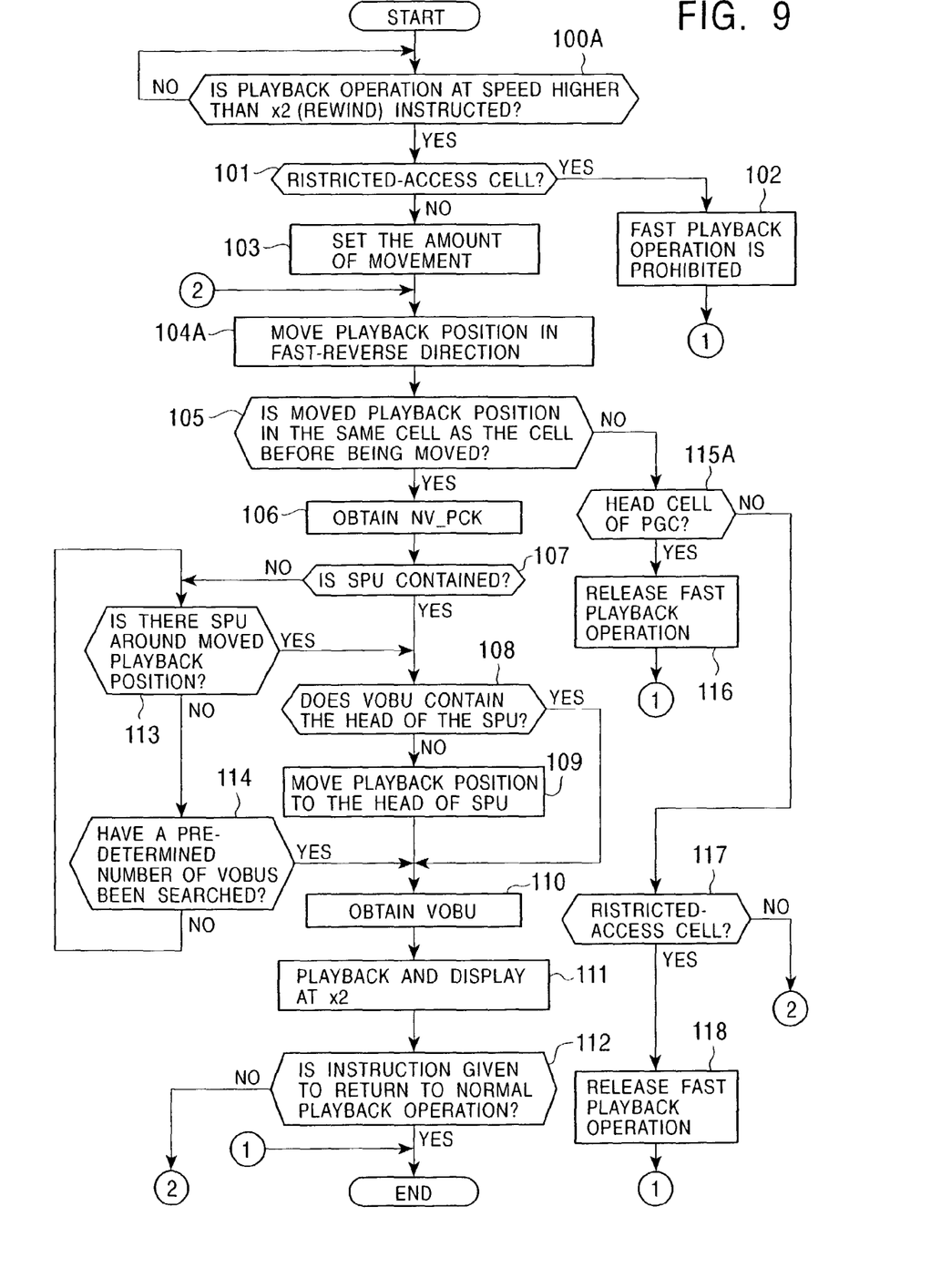
FIG. 9 is a flowchart illustrating the operation of the disk playback apparatus when a playback operation is performed at a speed greater than 2× in the rewind direction of the playback position.

A description is now given of the fast playback operation of the disk playback apparatus 100 in the rewind direction of the playback position. FIG. 9 is a flowchart illustrating the operation of the disk playback apparatus 100 when the playback operation is performed at a speed greater than 2× in the rewind direction.

The process shown in FIG. 9 is basically similar to that shown in FIG. 7. However, the direction in which the playback position is moved is the rewind direction in FIG. 9. More specifically, steps 100, 104, and 115 shown in FIG. 7 are substituted by steps 100A, 104A, and 115A, respectively. The features different than those of FIG. 7 are discussed below.

In step 100A, it is determined whether an instruction has been provided to perform a playback operation at a speed greater than 2× in the rewind direction of the playback position. In step 104A, the system controller 60 performs control such that the playback position is moved in the rewind direction based on the set amount of movement. In step 115A, it is determined whether the cell corresponding to the moved playback position is the head cell of the program chain (PGC).

Figure 10:
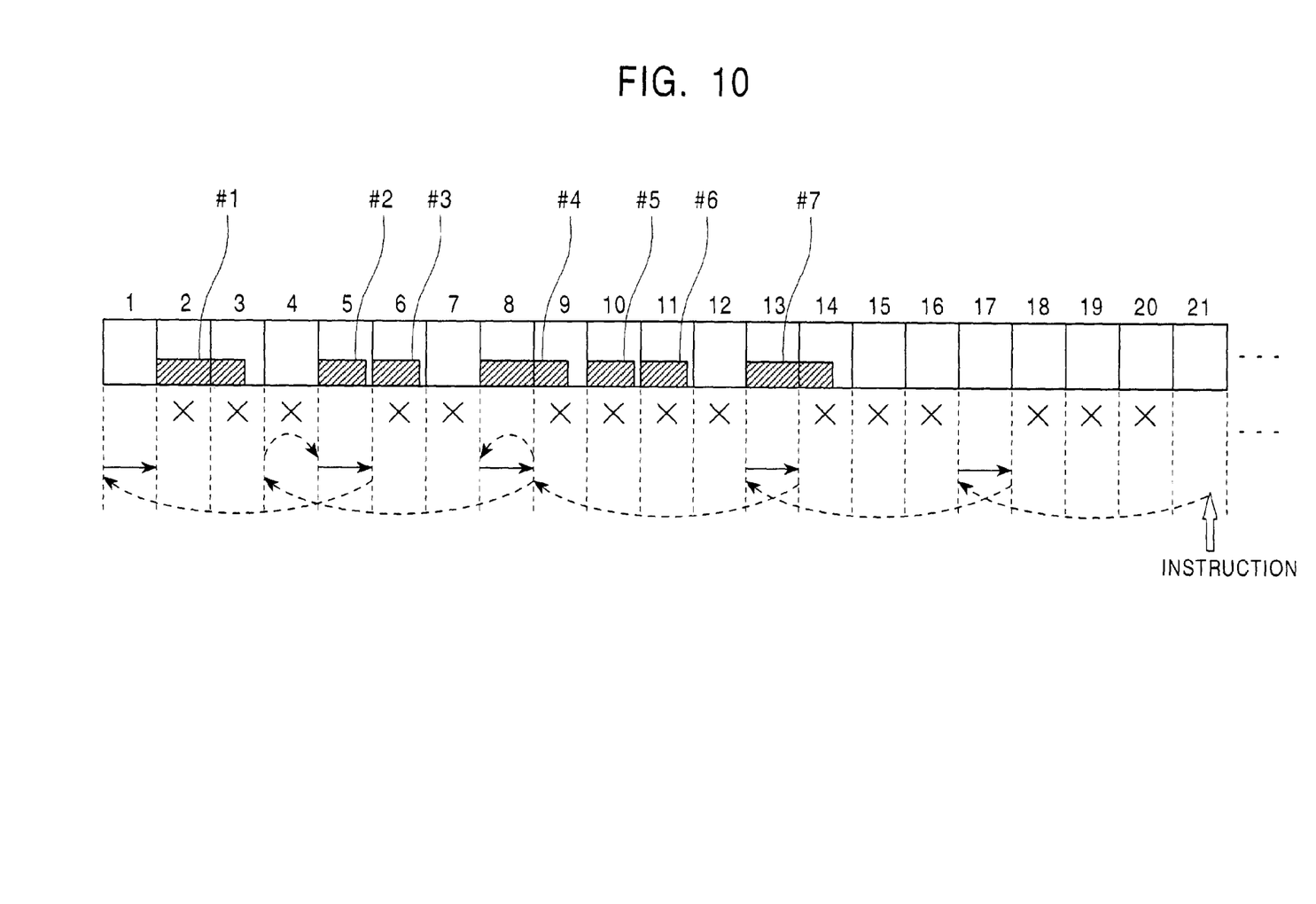
FIG. 10 illustrates a specific example of the playback operation performed at a speed greater than 2× in the rewind direction of the playback position.

FIG. 10 illustrates a specific example of the fast playback operation performed at a speed greater than 2× in the rewind direction. As in FIG. 8, rectangles indicated by numbers 1 through 21 are VOBUs, and hatched rectangles in the VOBUs are SPUs. The horizontal length of the SPUs indicate the effective duration for which the subtitles are displayed. In this example, it is assumed that the amount of movement is set to three VOBUs.

When an instruction is given to perform a playback operation at a speed greater than 2× in the rewind direction while performing the normal playback operation by using VOBU21, the playback position is moved in the rewind direction based on the set amount of movement, i.e., the playback position is moved to VOBU17 by skipping VOBU18 through VOBU20. Since an SPU is not contained in VOBU17, a predetermined number of VOBUs before and after VOBU17 are searched. In the example shown in FIG. 10, the two VOBs before VOBU17 and the two VOBUs after VOBU17, i.e., VOBU15, VOBU16, VOBU18, and VOBU19, are searched. Since none of the VOBUs contains an SPU, the fast playback operation for only the image is performed at 2× by using VOBU17.

Upon completing the fast playback operation by using VOBU17, the playback position is moved to VOBU13 by skipping VOBU14 through VOBU16. Since VOBU13 contains the head of SPU#7, the fast playback operation is performed at 2× by using VOBU13. Upon completing the fast playback operation by using VOBU13, the playback position is moved to VOBU9. Although VOBU9 contains SPU#4, it does not contain the head of SPU#4. Accordingly, the playback position is adjusted to VOBU8, which contains the head of SPU#4. Then, the fast playback operation is performed at 2× by using VOBU8.

Upon completing the fast playback operation by using VOBU8, the playback position is moved to VOBU4 by skipping VOBU5 through VOBU7. Since VOBU4 does not contain an SPU, VOBUs around VOBU4 are searched for an SPU. In the example shown in FIG. 10, since VOBU5 contains the head of SPU#2, the playback position is adjusted to VOBU5, and the fast playback operation is performed at 2× by using VOBU5. Upon completing the playback operation by using VOBU5, the playback position is moved to VOBU1.

Accordingly, in the disk playback apparatus 100 of this embodiment, the fast playback operation at 2× in which the subtitles can be displayed and the movement operation for moving the playback position are alternately performed, thereby implementing the playback operation at a speed greater than 2×. Thus, it is possible to play back and display the subtitles even when the playback operation is performed at a speed greater than 2×. Since the playback position is adjusted by detecting the head of an SPU, the subtitles can be displayed even when the moved playback position is originally displaced from the position at which the subtitles cannot be displayed. Accordingly, a desired playback position can be located by checking the subtitles, thereby improving the ease of operation. Additionally, since the fast playback operation is performed at 2×, the decoding processing for images and subtitles can be easily performed without the need to prepare an expensive decoder. Thus, the cost of the disk playback apparatus 100 can be kept low. Since the playback operation is performed at 2×, the user is able to read and understand the subtitles.

The present invention is not restricted to the above-described embodiment, and various modifications may be made within the spirit of the invention. For example, in the foregoing embodiment, when the playback operation is performed at a speed greater than 2×, a VOBU is intermittently extracted based on the set amount of movement according to the playback speed, and if an SPU is not contained in the extracted VOBU, VOBUs around the extracted VOBU are searched. However, VOBUs containing the head of an SPU may be sequentially searched, and the fast playback operation at 2× is performed by using such VOBUs. Then, the playback position is moved without performing the fast playback operation by using the other VOBUs, i.e., the VOBUs which do not contain the head of an SPU.

Figure 11:
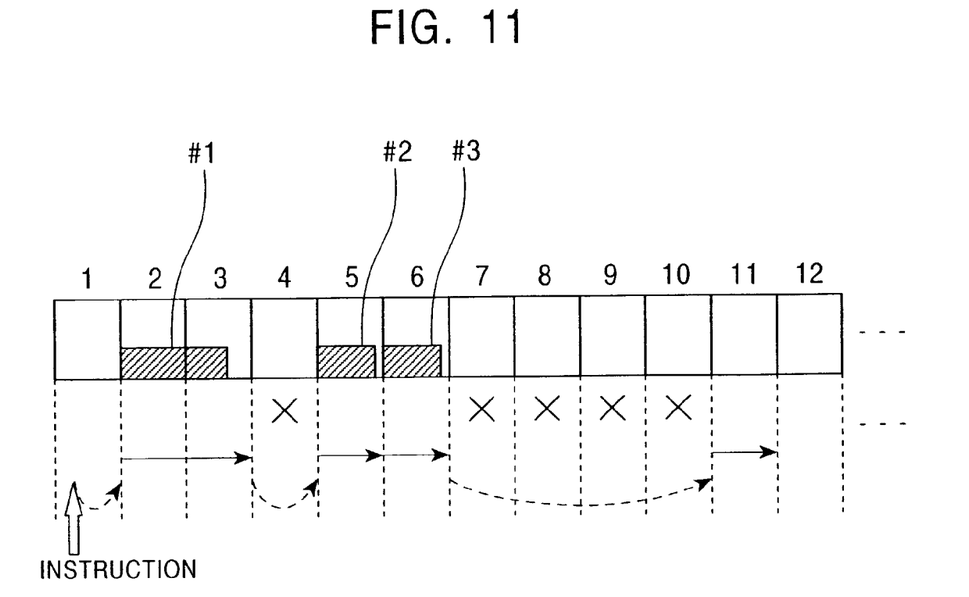
FIG. 11 illustrates a specific example of a playback operation performed at a speed greater than 2× in the forward direction of the playback position in a modified embodiment in which VOBUs containing the head of an SPU are sequentially searched.

FIG. 11 illustrates a modified example in which VOBUs containing the head of an SPU are sequentially searched. More specifically, FIG. 11 illustrates the fast playback operation performed at a speed greater than 2× in the forward direction in the above-described modified example. As in FIGS. 8 and 10, rectangles indicated by numbers 1 through 12 are VOBs, and hatched rectangles contained in the VOBs are SPUs. The horizontal length of the SPUs indicates the effective duration for which the subtitles are displayed.

When an instruction is given to perform a playback operation at a speed greater than 2× while the normal playback operation is being performed by using VOBU1, another VOBU, which is located in the forward direction with respect to the current playback position and which contains the head of an SPU, is searched. In the example shown in FIG. 11, since VOBU2 contains the head of SPU#1, the fast playback operation is performed at 2× by using VOBU2 and VOBU3 in accordance with the effective duration of SPU#1.

Upon completing the fast playback operation by using VOBU2 and VOBU3, the subsequent VOBU containing the head of an SPU is searched. Accordingly, the playback position is moved to VOBU5 by skipping VOBU4, and the fast playback operation is performed at 2× by using VOBU5. Upon completing the playback operation by using VOBU5, the subsequent VOBU containing the head of an SPU is searched, and the fast playback operation is performed at 2× by using VOBU6.

Upon completing the fast playback operation by using VOBU6, the subsequent VOBU containing the head of an SPU is searched. In the example shown in FIG. 11, however, there is no VOBU containing the head of an SPU for a while. Thus, the playback position is moved to VOBU11 by skipping four VOBUs (VOBU7 through VOBU10), and at this point, the movement operation is suspended. Then, the fast playback operation is performed at 2× by using VOBU11, which does not contain the head of an SPU. As in this case, if a VOBU containing the head of an SPU cannot be found after searching a certain number of VOBUs (four in this example), the fast playback operation is performed by using a VOBU which does not contain the head of an SPU. Accordingly, even if the period for which the subtitles are not displayed continues for a while, the playback operation is performed. Otherwise, it would be difficult for the user to understand the relationship between the two scenes.

Figure 12:
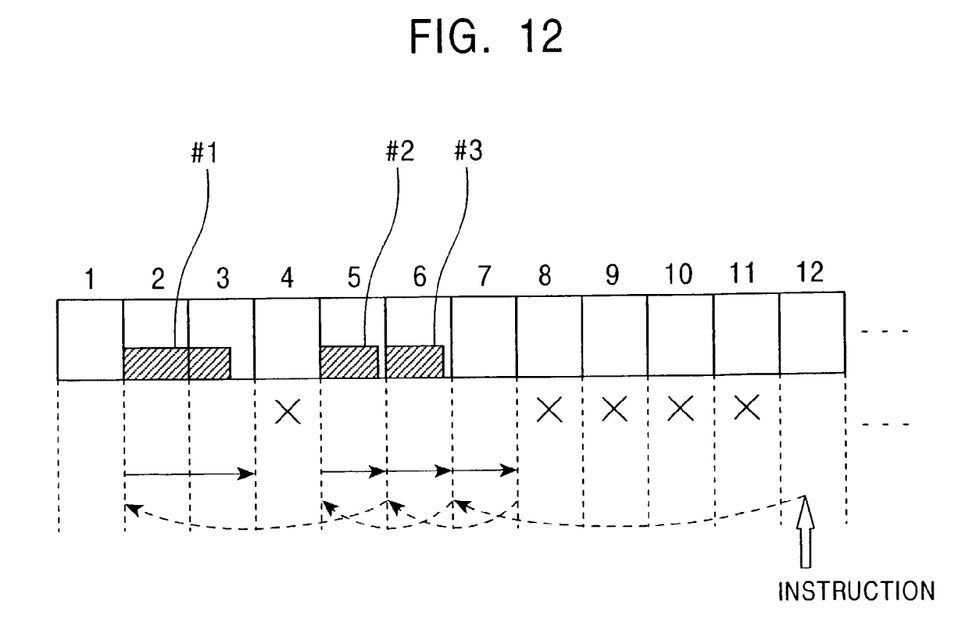
FIG. 12 illustrates a specific example of a playback operation performed at a speed greater than 2× in the rewind direction of the playback position in a modified embodiment in which VOBUs containing the head of an SPU are sequentially searched.

FIG. 12 illustrates another modified example in which VOBUs containing the head of an SPU are sequentially searched. More specifically, FIG. 12 illustrates the playback operation performed at a speed greater than 2× in the rewind direction. As in FIGS. 8, 10, and 11, rectangles indicated by numbers 1 through 12 are VOBUs, and hatched rectangles in the VOBUs are SPUs. The horizontal length of the SPUs indicates the effective duration for which the subtitles are displayed.

When an instruction is given to perform a playback operation (rewind) at a speed greater than 2× while the normal playback operation is performed by using VOBU12, another VOBU which is located in the rewind direction with respect to the current playback position and which contains the head of an SPU is searched. In the example shown in FIG. 12, however, there is no VOBU containing the head of an SPU for a while. Thus, the playback position is moved to VOBU7 by skipping four VOBUs (VOBU8 through VOBU11), and at this point, the movement operation is suspended. Then, the fast playback operation is performed at 2× by using VOBU7, which does not contain the head of an SPU.

Upon completing the fast playback operation by using VOBU7, the subsequent VOBU containing the head of an SPU is searched. Then, the playback position is moved to VOBU6, which contains the head of SPU#3, and the fast playback operation is performed at 2× by using VOBU6. Upon completing the fast playback operation by using VOBU6, the subsequent VOBU containing the head of an SPU is searched. Then, the playback position is moved to VOBU5, which contains the head of SPU#2, and the fast playback operation is performed at 2× by using VOBU5. Upon completing the playback operation by using VOBU5, the subsequent VOBU containing the head of an SPU is searched, and the playback position is moved to VOBU2, which contains the head of SPU#1. Then, the fast playback operation is performed at 2× by using VOBU2 and VOBU3 in accordance with the effective duration of SPU#1.

As discussed above, if the subtitle information (SPU) required for playing back the subtitles is dispersed in part of the video information (VOBU) required for playing back the video images, the subtitles and the corresponding images are played back, and then, the playback position is moved to the position at which the subtitles can be subsequently displayed. With this arrangement, the subtitles can be reliably extracted and played back.

In the above-described embodiment, the processing performance of the disk playback apparatus 100 which enables the display of the subtitles is set to 2×. However, the processing performance may be set to a speed greater than 2×.

In the above-described embodiment, the playback operation is performed by loading the DVD 10 in the disk playback apparatus 100. However, in the present invention, another type of disk recording medium, such as a video CD or a DVD-RAM, may be used for playing back the images recorded therein.

The invention claimed is:

1. A disk playback apparatus for playing back video images and subtitles recorded on a disk recording medium, comprising:
   a playback unit for performing (i) a normal playback operation for continuously playing back the video images and the subtitles at a normal playback speed of x, and (ii) a fast playback operation for continuously playing back the video images and the subtitles at a playback speed of nx (where n >1) at which speed subtitles still are able to be displayed with the video images;
   a movement controller for moving a playback position by skipping a portion of the recorded video images;
   an operation unit for providing a playback instruction by specifying a desired playback speed; and
   an operation/movement alternating controller for performing control so that the fast playback operation at speed nx performed by the playback unit and the movement operation performed by the movement controller are alternately repeated, when the desired playback speed is greater than nx and subtitles are not able to be displayed by continuously playing back the video images and the subtitles at the desired playback speed.

2. A disk playback apparatus according to claim 1, wherein the playback speed which enables the subtitles to be displayed is 2×.

3. A disk playback apparatus according to claim 1, wherein the disk recording medium is a digital versatile disk, and said movement controller moves the playback position by using video object units as a reference.

4. A disk playback apparatus according to claim 1, wherein subtitle information required for playing back the subtitles is dispersed in video information required for playing back the video images, and, after the subtitles and the corresponding video images are played back, said movement controller moves the playback position to a position at which the next subtitles are to be displayed.

5. A disk playback apparatus according to claim 1, further comprising an amount-of-movement varying unit for setting a variable amount of movement by which the playback position is to be moved by said movement controller.

6. A disk playback apparatus according to claim 1, wherein playback information recorded in the disk recording medium contains a restricted area in which the playback operation to be performed at a playback speed other than the normal playback speed is restricted, and, when the playback position moved by said movement controller is contained within the restricted area, said playback unit performs the normal playback operation until the playback position is located outside the restricted area.

7. A disk playback apparatus according to claim 6, wherein:
   the disk recording medium is a digital versatile disk;
   the restricted area is set in units of cells; and
   said playback unit performs the normal playback operation when the playback position is moved to a cell in which the restricted area is set.

8. A disk playback apparatus according to claim 1, wherein said movement controller performs the movement operation in the forward direction of the playback position.

9. A disk playback apparatus according to claim 1, wherein said movement controller performs the movement operation in the rewind direction of the playback position.

10. A disk playback apparatus for playing back video images and subtitles recorded on a disk recording medium, the subtitles being played back as subtitle information that is to be played back only at predetermined playback positions, comprising:
   a playback unit for performing (i) a normal playback operation for continuously playing back the video images and the subtitles at a normal playback speed of x, and (ii) a fast playback operation for continuously playing back the video images and the subtitles at a playback speed of nx (where n >1) at which speed subtitles still are able to be displayed with the video images;
   a movement controller for moving a playback position by skipping a portion of the recorded video images;
   an operation unit for providing a playback instruction by specifying a desired playback speed; and
   an operation/movement alternating controller for performing control so that the fast playback operation at speed nx performed by the playback unit and the movement operation performed by the movement controller are alternately repeated, when the desired playback speed is greater than nx and subtitles are not able to be displayed by continuously playing back the video images and the subtitles at the desired playback speed;
   wherein when the moved playback position is displaced from the predetermined playback positions, a predetermined range before and after the moved playback position is searched to detect the a predetermined playback position, thereby adjusting the playback position.

11. A disk playback apparatus according to claim 10, wherein, when the predetermined playback position is not detected in the predetermined range, the fast playback operation is temporarily performed in such a manner that the subtitles are not played back.

12. A disk playback apparatus according to claim 10, wherein;

the disk recording medium is a digital versatile disk;

the predetermined playback position is located at a head of a sub-picture unit; and in moving the playback position by using video object units as a reference, when the head of the sub-picture unit is not contained in the video object unit to which the playback position is moved, the video object unit containing the head of the sub-picture unit is searched for in the vicinity of the video object unit to which the playback position is moved.

13. A disk playback apparatus according to claim 12, wherein the head of the sub-picture unit is searched for based on information of a navigation pack which is obtained before searching for the head of the sub-picture unit.

14. A disk playback method for playing back video images and subtitles recorded on a disk recording medium, wherein a normal playback operation for continuously playing back the video images and the subtitles is performed at a normal playback speed of x, and a fast playback operation for continuously playing back the video images and the subtitles is performed at a playback speed of nx (where n >1) at which speed subtitles still are able to be displayed with the video images, the method comprising:

receiving a playback instruction specifying a desired playback speed; and when the desired playback speed is greater than nx and subtitles are not able to be displayed by continuously playing back the video images and the subtitles at the desired playback speed, performing control so that the fast playback operation at speed nx and a movement operation for moving a playback position by skipping a portion of the recorded video images are alternately repeated.

15. A disk playback method according to claim 14, wherein playback information recorded on the disk recording medium contains a restricted area in which the playback operation to be performed at a playback speed other than the normal playback speed is restricted, and, when the playback position moved in said movement operation is contained within the restricted area, the normal playback operation is performed until the playback position is located outside the restricted area.

16. A disk playback method for playing back video images and subtitles recorded on a disk recording medium, the subtitles being played back as subtitle information that is to be played back only at predetermined playback positions, wherein a normal playback operation for continuously playing back the video images and the subtitles is performed at a normal playback speed of x, and a fast playback operation for continuously playing back the video images and the subtitles is performed at a playback speed of nx (where n >1) at which speed subtitles still are able to be displayed with the video images, said disk playback method comprising:

receiving a playback instruction specifying a desired playback speed; and when the desired playback speed is greater than nx and subtitles are not able to be displayed by continuously playing back the video images and the subtitles at the desired playback speed, performing control so that the fast playback operation at speed nx and a movement operation for moving a playback position by skipping a portion of the recorded video images are alternately repeated;

wherein, when the moved playback position is displaced from the predetermined playback positions, searching a predetermined range before and after the moved playback position to detect a predetermined playback position, thereby adjusting the playback position.

17. A disk playback method according to claim 16, wherein:

the disk recording medium is a digital versatile disk;

the predetermined playback position is located at a head of a sub-picture unit; and in moving the playback position by using video object units as a reference, when the head of the sub-picture unit is not contained in the video object unit to which the playback position is moved, searching for the video object unit containing the head of the sub-picture unit in the vicinity of the video object unit to which the playback position is moved.

* * * * *